Nov. 16, 1948.　　　L. J. B. GLUZEK　　　2,453,841
MEDICAL DIAGNOSTIC DEVICE
Filed Dec. 26, 1944
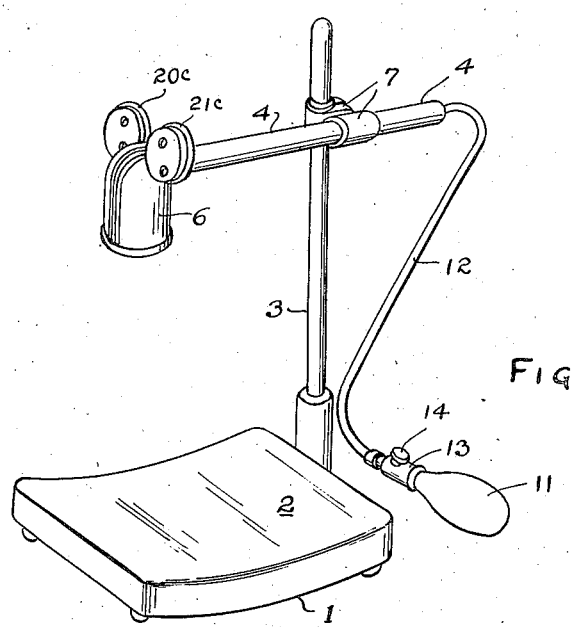
FIG-1
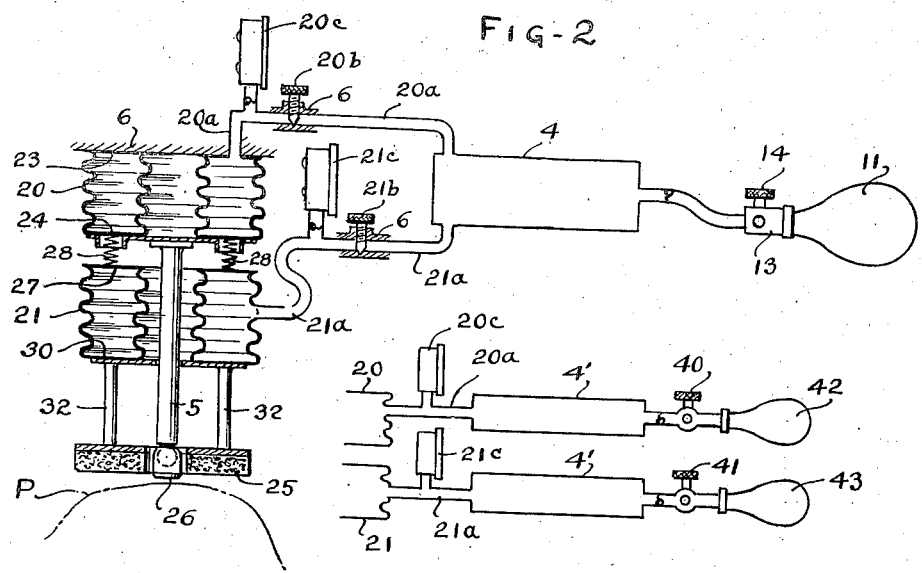
FIG-2
FIG-3
INVENTOR
LORAND J. B. GLUZEK
BY
ATTORNEY Patented Nov. 16, 1948

2,453,841

UNITED STATES PATENT OFFICE 2,453,841

MEDICAL DIAGNOSTIC DEVICE

Lorand J. B. Gluzek, Parma, Ohio, assignor to Dolorimeter, Inc., Cleveland, Ohio, a corporation of Ohio Application December 26, 1944, Serial No. 569,850

1 Claim. (Cl. 128—2)

This invention relates to an instrument for measuring the pain sensibility and pain in humans. The embodiment disclosed is on the order of the diagnostic device shown in my Patent No. 1,842,323, issued January 19, 1932. In the use of the instrument shown in said patent, and also with the present arrangement, localized pain producing pressure is applied to a small area of the human body such as on the frontal face of the tibia or on the central region of the forehead and the applied pressure is increased until the subject indicates that pain is felt. Thereupon commutating or neutralizing pressure is applied closely adjacent the area of pain inducing pressure but over a considerably larger area until the patient indicates that the pain has been relieved. The person making the test notes at what pressures pain and relief, respectively, are allegedly experienced. As the commutating pressure is gradually removed the pressure point is noted at which the patient again claims to experience pain. If original occurrence and subsequent reoccurrence of pain are at the same pressure point the person making the test is reasonably certain that the information furnished by the subject is accurate. By comparison with previously arranged charts the person making the test is able to arrive at the true pain threshold and can make proper deductions in respect to complaints on part of the subject as to pain intensity allegedly experienced by the patient. Also the apparatus is useful in determining whether the subject is susceptible to memory or lingering pains. If, for instance, the patient indicates that the commutative pressure does not relieve the induced pain the person making the test knows that the subject experiences lingering pain. Thus the first operation or use of the apparatus is that of accurately measuring deep sensibility. An equally important use is for accurately measuring the tension value of any pain of which a person complains and this is done by administering to (e. g.) the tibia pressure or pressure pain until the tension value of the induced pain is higher than that of the pain complained of. When that tension value is reached the complainant will become conscious only of the induced pain and the pain complained of stops to register in his consciousness.

In the use of the apparatus shown by said patent it is practically necessary to retain the induced pressure at its original value during the entire period of the test but in the improved apparatus hereof the pain inducing pressure is actually decreased by counter pressure force during application of the commutative pressure. The pain inducing pressure returns to exactly its original value as the commutative pressure is removed.

Additionally, the present arrangement greatly simplifies manufacture and enables the instrument to be made as a high precision instrument with much less expense as compared to the arrangement according to said patent.

The above indicates the principal objects of the invention. Further objects include the provision of a diagnostic device of the character indicated in which one of the pressures, induced or commutative or both is or are produced and measured by fluid pressure operated means and controlled or adjusted by valves.

Other objects and advantages of the invention will become apparent from the following specification with reference to the drawings, in which Fig. 1 is a perspective view showing the improved apparatus in one form;

Fig. 2 is a sectional view in the nature of a diagram showing the physical relationship of parts; and Fig. 3 is a similar partial diagram showing a further modification of the invention.

Referring to Fig. 1 a suitable base is indicated at 1, the top surface 2 of which constitutes a pad on which the leg or head of the patient to be tested is supported in comfortable position. A standard having a vertical post 3 is fixedly attached to the base at one side and the post 3 adjustably carries an arm 4 which holds a testing head assembly 6 in spaced relation to the base and centrally over the part or area to be tested when the arm 4 has been properly adjusted with respect to the subject.

The post 3 and arm 4 are cylindrical parts with uniform respective diameters, each having a considerable extent and the two members 3 and 4 are connected by a universal coupling 7 enabling the arm 4 to be swung in a horizontal plane, to be raised and lowered to bring the head 6 to the desired position and also to enable the head 6 to be bodily rotated about the axis of the arm 4. When the desired adjusted position of the head has been attained the parts 3 and 4 are clamped tightly together preferably by a single threaded member such as a wing nut, not shown herein but as may be accomplished by the universal clamp arrangement shown at the right in Fig. 1 of said patent.

In the preferred construction hereof, the inductor or pain rod 5 (see Fig. 2) and the commutative pressure member 25 (same figure) are coaxially mounted on the head 6 so as to be operative at the lower side of said head. The commutative pressure pad 25 may be of sponge rubber or the like in the form of a ring disposed at the bottom of the head. The area of the pad is at least ten times that of the rod surface 26.

The arm 4 is preferably made as a tube to constitute a reservoir for elastic fluid such as air which may be forced as by a bulb pump 11 through a flexible tube 12 connected to the reservoir portion of the arm 4. The pump constituted by the bulb 11 is provided with the usual arrangement of inlet and outlet check valves and, additionally, the fitting 13 of the pump has a needle valve 14 by which the contents of the reservoir can be vented to atmosphere. In the closed portion of the needle valve the bulb remains in communication with the reservoir 4.

Referring particularly to Fig. 2 this shows the preferred arrangement of pressure actuated members 20 and 21 connected to the reservoir 4 as by conduits formed in the head 6 which is preferably a casting. The members 20 and 21 as shown are annular metal bellows devices of a common type connected to the reservoir 4 by conduits 20a and 21a, respectively. The pressure space of the bellows 20 can be discommunicated from the reservoir to trap air in the bellows as by a suitable needle valve 20b in the conduit 20a. In suitable communication with the pressure space of the bellows 20, as by connection with the conduit 20a, is a pressure gage 20c. Similarly, the bellows 21 is provided with a control valve 21b and gage 21c. Regardless of how arranged the gage 20c indicates at all times the pressure in the bellows 20 and the gage 21c always indicates the pressure in the bellows 21. The reservoir is of sufficient capacity so that when charged with elastic fluid by the pump it contains sufficient volume and pressure for operation of both bellows to make one test.

One end wall of the bellows 20 is supported as on a fixed surface 23 of the head and the opposite end wall 24 centrally supports the rod 5, the lower end surface 26 of which is the induced pressure applying part of the rod. The lower end of the rod may be a separate part universally connected to the upper part of the rod for approximately 10° of adjustment so that the acting face of the rod 5 will always be positionable into flat contact with the subject area at which pain inducing pressure is to be applied. The rod 5 may have an additional, supporting, lateral guide.

The bellows 21 has a floating support. The top wall 27 of the bellows 21 is connected as by a series of light weight supporting springs 28 with the wall 24 of the bellows 20 or with some other part of the apparatus for suspension only. Additionally, the adjacent walls 24 and 27 of the two bellows are initially positioned for operative abutment a predetermined short distance apart, for example six millimeters or enough to enable the full pain inducing thrust of the rod 5 without causing the bellows 20 to force downwardly on the bellows 21. The lower wall 30 of the bellows 21 carries the commutative pressure pad 25 normally in a position slightly above the surface 26 of the pain applying rod 5. The pad may have a sponge rubber or other yieldable facing for cushioning contact with the subject, and the connection of the pad to the wall 30 of the bellows 21 may comprise a suitable number of stiff vertical rods 32, two being shown. The conduit 21a should have a flexible portion for connection with the bellows 21 in order to permit free vertical movement of said bellows.

In a typical use of the apparatus the head 6, Fig. 1, is so adjusted that the surface 26 of the pain applying rod 5 is in light contact with a body part such as adjacent the frontal surface of the tibia of a patient's leg, diagrammatically shown at P. Thereupon, assuming that a sufficient supply of air at somewhat greater pressure than necessary has been pumped into the reservoir 4, the person making the test gradually opens the valve 20b allowing air from the reservoir to inflate the bellows 20 until the subject indicates that the pressure surface 26 of the pain inducing rod 5 is producing pain. The pressure point at which the patient says he feels pain may be observed with reference to gage 20c. Thereupon the valve 20b is closed, trapping the air in the bellows 20; and the valve 21b is gradually opened. The bellows 21 is thus expanded causing pain neutralizing downward pressure to be produced by the pad 25 around and closely adjacent the area of pain inducing pressure as soon as the adjacent walls of the two bellows are brought operatively into abutment. The pad because of its larger active pressure area counteracts the induced pain by producing a larger area or surface pressure around the area contacted by the pain producing rod. In addition, since the wall 27 of the bellows 21 is free to rise, said wall 27, in coming into operative abutment with the wall 24 of the bellows 20, (reacting against the subject through the pad 25) compresses the trapped air in the bellows 20 and raises the wall 24, hence the pain applying rod 5 as well.

Pressure on the commutator pad having been continued until the pain is indicated by the patient as having ceased, the pressure in the bellows 21 can now be relieved by opening the valve 21b and the valve 14 which discharges air from the reservoir to the atmosphere. Thus the bellows 20 is again rendered effective to produce exactly the initial pressure on the pain applying rod. The person making the test does not have to observe the pressure at the gage 20c a second time or reinflate the bellows 20 in order again to produce a determinative pain intensity. After the patient indicates recurrence of the pain the valve 20b is opened thereby lifting the rod 25, completing the test.

If the gradual application of the commutator pad surface does not elicit expression by the patient that the induced pain is relieved then the person making the test knows that the subject is sensitive to memory or lingering pain. The same information is again obtainable when the pain applying rod is finally lifted at completion of the test.

When separate air supply chambers are used for the bellows 20 and 21, respectively, as in Fig. 3 it is then not necessary to maintain in reserve a super-abundance of pressure, that is pressure enough to inflate both bellows, but simply enough to operate the respective bellows separately. The arrangement of Fig. 3 would be operated the same as the apparatus according to Fig. 2 except that single air trapping and venting valves 40 and 41 may be used between the pumps 42 and 43 and the respective bellows 20 and 21, thus enabling the valves 20b and 21b to be omitted. The valves 40 and 41 act to lock air in the respective bellows and subsequently to vent the trapped air to the atmosphere. The gages 20c and 21c are arranged as before in communication with respective bellows. In operating an arrangement having the supply system according to Fig. 3, the person making the test causes the necessary inductive pain producing pressure to be created in the bellows 20 by operation of the pump 42 and closes the valve 40 to trap the air in the bellows when the subject indicates that he feels pain. Thereupon the pump 43 is operated. The valve 41 is closed when the pain is indicated as having ceased. The person making the test can then immediately open the valve 41 causing recurrence of pain and finally open the valve 40 to enable the contracting bellows 20 to lift the pain applying rod 5.

It will be obvious that inflatable bags of any description or conventional sliding plunger type piston and cylinder elements can be used in place of the bellows 20 and 21. Said bellows are recommended, however, because of their inherent resilient nature for automatically repositioning of the rod 5 and pad 25 when the pressure is released from the respective bellows.

I claim:

In a dolormeter instrument, a fluid pressure operated spring bellows having an applicator arranged to apply pain producing pressure over a relatively small body area, a second fluid pressure operated spring bellows with an applicator adapted to apply a pain neutralizing pressure to a larger body area adjacent said first body area, and abutment means between relatively adjacent but normally spaced walls of respective bellows and operative to cause the second bellows to act automatically on the first bellows to cause it to move bodily in a direction away from said small body area whereby to lessen the actual pressure applied thereby to said small body area during application of said neutralizing pressure.

LORAND J. B. GLUZEK.

REFERENCES CITED

The following references are of record in the file of this patent:

UNITED STATES PATENTS

| Number | Name | Date |
|---|---|---|
| 1,842,323 | Gluzek | Jan. 19, 1932 |
| 2,125,483 | Blanchard | Aug. 2, 1938 |
| 2,341,137 | Damron | Feb. 8, 1944 |